United States Patent [19]
Golestan et al.

[11] Patent Number: 5,529,090
[45] Date of Patent: Jun. 25, 1996

[54] ENHANCED SOLID PISTON FLOW CONTROLLER

[75] Inventors: Farhad Golestan; John M. Trantham, both of Dallas, Tex.

[73] Assignee: Flow Design, Inc., Dallas, Tex.

[21] Appl. No.: 375,939

[22] Filed: Jan. 20, 1995

Related U.S. Application Data

[63] Continuation-in-part of Ser. No. 143,308, Oct. 26, 1993, Pat. No. 5,383,489.

[51] Int. Cl.⁶ ..................................................... G05D 7/01
[52] U.S. Cl. ......................................................... 137/504
[58] Field of Search .................................. 137/501, 503, 137/504

[56] References Cited

U.S. PATENT DOCUMENTS

| | | | |
|---|---|---|---|
| 371,063 | 10/1887 | Hays | 137/503 |
| 2,592,380 | 4/1952 | Beckett | 137/501 |
| 3,015,341 | 1/1962 | Hedland et al. | 137/193 |
| 3,112,764 | 12/1963 | Anderson et al. | 137/504 |
| 3,130,747 | 4/1964 | Benaway | 137/504 |
| 3,131,716 | 5/1964 | Griswold et al. | 137/503 |
| 3,339,580 | 9/1967 | Cutler et al. | 137/504 |
| 3,599,667 | 8/1971 | Kaser | 137/504 X |
| 3,752,183 | 8/1973 | Griswold | 137/504 |
| 3,752,184 | 8/1973 | Griswold | 137/504 |
| 3,756,272 | 9/1973 | Hammond | 137/498 |
| 3,974,853 | 8/1976 | Bentley | 137/503 |
| 4,080,993 | 3/1978 | Lind, Jr. | 137/504 |
| 4,766,928 | 8/1988 | Golestaneh | 137/504 |
| 5,054,516 | 10/1991 | Okerblom | 137/504 |
| 5,174,330 | 12/1992 | Golestan et al. | 137/504 |
| 5,265,643 | 11/1993 | Golestan et al. | 437/504 |

FOREIGN PATENT DOCUMENTS

| | | |
|---|---|---|
| 1437834 | 6/1966 | France . |
| 89576 | 7/1967 | France . |
| 186150 | 6/1907 | Germany . |
| 19113899 | 10/1970 | Germany . |
| 2258787 | 3/1976 | Germany . |

OTHER PUBLICATIONS

David Wooten and Ali Marandi, "Flow Control Valves Under the Microscope," *Control and Instrumentation*, Apr., 1986, pp. 61 and 63.

*Primary Examiner*—Stephen M. Hepperle
*Attorney, Agent, or Firm*—Baker & Botts

[57] ABSTRACT

A flow control valve (10) is provided including a valve body (20) and a piston (16). The valve body (20) has extending therethrough a longitudinal bore (18) defining a fluid passage (32). The piston (16) is slidably disposed within the bore (18) to vary the flow area of a fluid flow through the control valve (10). The piston (16) has a generally cylindrical body formed from a solid piece of material. The piston (16) contains a longitudinal flow channel (24). The longitudinal flow channel (24) has a varying depth. The piston (16) preferably slides within the longitudinal bore (18) to vary the flow area of the fluid passage (32) such that the fluid flow through the control valve (10) is substantially constant over a selected range of pressure differentials across the control valve (10).

19 Claims, 1 Drawing Sheet

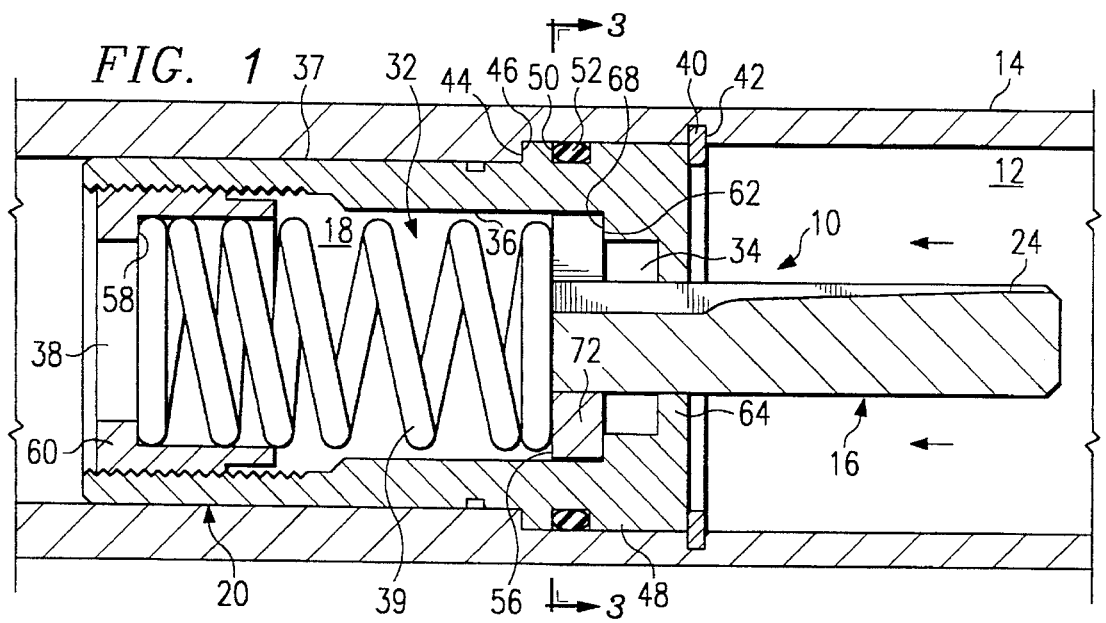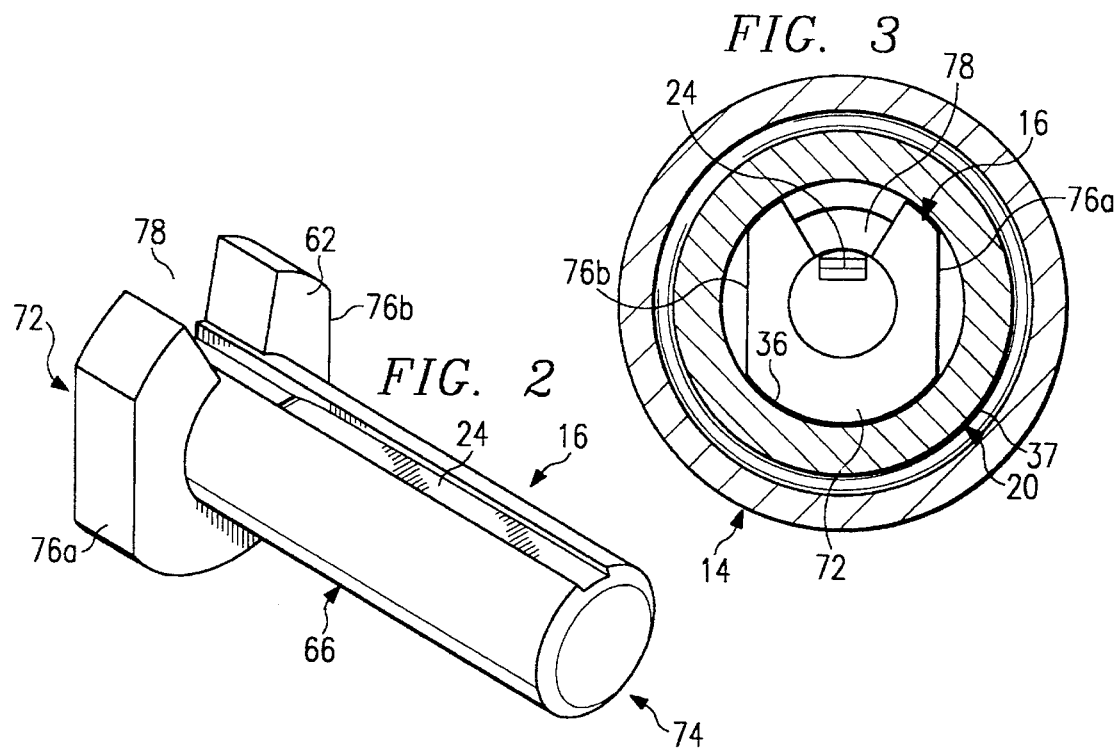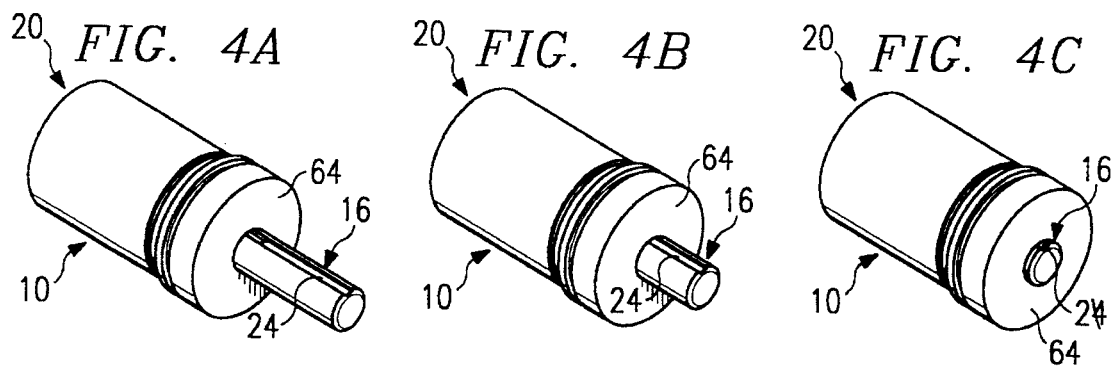

ENHANCED SOLID PISTON FLOW CONTROLLER

RELATED APPLICATIONS

This application is a continuation-in-part of U.S. patent application Ser. No. 08/143,308 filed Oct. 26, 1993, entitled A Flow Control Valve with Enhanced Flow Control Piston, of same assignee, now U.S. Pat. No. 5,383,489.

TECHNICAL FIELD OF THE INVENTION

The present invention pertains in general to flow control valves and more particularly to an automatic flow control valve having a solid flow control piston.

BACKGROUND OF THE INVENTION

Constant flow control valves have numerous applications in piping networks. For example, in a building air conditioning and heating system, water or other liquid at an appropriate control temperature may be pumped from a central station through a piping network to various heat exchanger units located throughout the building. Some of these heat exchanger units are located relatively close to the central station while others are located much farther away. The fluid pressure applied across inputs and outputs of the respective heat exchanger units varies widely because of factors such as frictional losses inherent in the flow of the liquid through the piping network and the distances the liquid must travel from the central station.

The flow rate in each branch of the network is a direct function of the pressure drop existing across that branch. Two contributors to the existence and magnitude of the pressure drop are line friction and equipment pressure drop. The actual pressure drop in one branch is often different from the original desired, or designed, value, leading to a flow rate in that branch which is different from the desired flow rate. Changes from the desired flow rate in one branch will influence the flow rate in other branches. To obtain the desired flow rate in the various branches of such a network, the network should be hydraulically balanced.

Hydraulic balancing often involves adding additional pressure to one or more branches within the system, a measure which may create wasteful pressure drops therein. Pumps are frequently oversized to provide the additional pressure required to balance the network. Because these pumps are frequently operated at flow rates and pressures other than their optimum performance conditions, wasteful energy consumption results.

Constant flow control valves help alleviate the need for hydraulic balancing. Examples of such control valves are disclosed in U.S. Pat. No. 4,766,928 issued to Golestaneh and U.S. Pat. No. 5,174,330 issued to Golestan et al. Both references disclose a constant flow rate control valve including a movable piston having a plurality of side ports and an orifice on an end wall of the piston. Pressure differential across the valve moves the piston against a resilient spring to expose an appropriate portion of the side port area to maintain a constant flow rate at that pressure differential. There is a minimum pressure differential required for the flow rate to increase for establishing the desired flow rate for the Golestaneh, Golestan et al. and other prior control valves. For some systems, particularly those with long piping runs, even this minimum pressure drop may not be attainable. For high volume flows, reaching this minimum is costing energy usage.

In the previously known constant flow control valves, a variable orifice regulates the fluid flow. In these constant flow control valves, the variable orifice is distributed along the outside of a hollow piston. As the differential pressure increases, a portion of the orifice moves below the shoulder which reduces the flow passage area. For small flow rates, this distribution of the passage along the entire length of the hollow piston requires that it become extremely narrow. Because the port is so narrow, a small variation in width may be relatively significant and cause a significant variation in the flow rate. Also, with this type of valve, there is some fluid that flows between the outside of the piston and the shoulder which is affected by manufacturing variations in the piston and shoulder. For a given manufacturing variation in the diameter of the piston, the variation in the flow rate between the outside of the piston and the shoulder is typically proportional to the perimeter of the piston.

Another problem with prior control valves is that they may cause internal local disturbances near the piston as the fluid passes through the regulating orifice; these disturbances may reduce the energy of the fluid flow. Still another problem with prior control valves is that their parts and orifices may become clogged with fluid borne particles or have deformities which may alter the respective control valve flow characteristics. Furthermore, prior control valves may have parts with critical dimensions which may require the valve to be expensively manufactured by high precision machinery.

SUMMARY OF THE INVENTION

In accordance with the present invention, the disadvantages and problems associated with previous flow control valves for regulating fluid flow rate have been substantially reduced or eliminated. The present invention provides a flow control valve including a valve body and a piston. The valve body has a longitudinal bore extending therethrough to define in part a flow passage. The piston is slidably disposed within the bore to vary the fluid flow area of the flow passage through the control valve. The piston has a generally cylindrical configuration formed from a solid piece of material. The piston preferably contains a longitudinal flow channel formed in the exterior of the piston, the longitudinal flow channel having an up stream end and a down stream end for communicating fluids therethrough. The piston preferably slides within the longitudinal bore to vary the flow area of the flow passage such that the fluid flow through the valve is substantially constant over a selected range of pressure differentials across the control valve.

One aspect of the present invention includes a control valve having a valve body with a longitudinal bore extending therethrough and a piston slidably disposed in the longitudinal bore. A longitudinal flow channel is formed in the exterior of the piston and has an up stream end and a down stream end for communicating fluids therethrough. An annular shoulder is preferably formed within the valve body adjacent to the exterior of the piston intermediate the up stream end and the down stream end of the longitudinal flow channel whereby the annular shoulder cooperates with the longitudinal flow channel of the piston to regulate fluid flow through the longitudinal bore. The longitudinal flow channel preferably has a varying depth.

The present invention provides numerous technical advantages. A technical advantage of the present invention may include providing for lower energy loss across the associated control valve.

Another technical advantage of the present invention may include providing a significant reduction in the disturbance of the flow field as the fluid flows through the associated control valve.

Another technical advantage of the present invention may include providing a reduced tendency to clog with particles carried by the fluid and a greater tolerance of clogs or deformities which may effect the fluid flow through the associated control valve. The flow regulating path associated with the piston of the present invention is not the small, narrow opening that may have made previously known valves sensitive to manufacturing variations and more likely to clog.

Another technical advantage of the present invention may include that the solid piston may be manufactured by standard precision tooling with a longitudinal flow channel having a variable depth to provide the desired flow characteristics for the associated control valve, i.e., without exotic machining.

Another technical advantage of the present invention may include that the longitudinal flow channel defines a flow passage which is substantially parallel with the fluid flow through the control valve. The present invention allows both the depth and width of the longitudinal flow channel to be selected to optimize performance of the associated control valve.

Another technical advantage of the present invention may include providing a reduction in the leakage of fluid around the perimeter of the piston in the associated control valve by reducing the piston perimeter. This and other features make the present invention particularly suitable for extremely low flow rate control.

Yet another technical advantage of the present invention is that the piston may be solid as opposed to hollow. Hollow pistons typically require a larger diameter to provide a flow path through the piston. The solid piston that may be used with the present invention allows for a smaller diameter which in turn reduces the influence of manufacturing variations on fluid flow between the shoulder and the piston since the effect of such a variation is directly proportional to the perimeter of the piston. Furthermore, because the piston may be solid, it may have additional strength.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a drawing in longitudinal section with portions broken away of a flow control valve incorporating the present invention;

FIG. 2 is an isometric view of a flow control piston used with the flow control valve of FIG. 1;

FIG. 3 is a drawing in radial section taken along line 3—3 of FIG. 1;

FIG. 4A is an isometric view of the flow control valve of FIG. 1 with the housing removed for purposes of illustration and the flow control piston in a low differential pressure position;

FIG. 4B is an isometric view of the flow control valve of FIG. 1 with the housing removed for purposes of illustration and the flow control piston in an intermediate differential pressure position; and FIG. 4C is an isometric view of the flow control valve of FIG. 1 with the housing removed for purposes of illustration and the flow control piston in a high differential pressure position.

DETAILED DESCRIPTION OF THE INVENTION

The preferred embodiment of the present invention and its advantages are best understood by referring to FIGS. 1–4C of the drawings, like numerals being used for like and corresponding parts of the various drawings.

Referring to FIG. 1, flow control valve 10 is shown disposed within longitudinal bore 12 of a housing 14. Housing 14 may be of a Y-pattern or any other suitable configuration. In some configurations, housing 14 may not be necessary. The general direction of the fluid flow in longitudinal bore 12 is shown by the arrows to be from right to left for the orientation shown. For purposes of illustration only, housing 14 is shown with a generally hollow, tubular configuration. Longitudinal bore 12 may be formed in a wide variety of housings having various configurations such as rectangular or square. Also, multiple longitudinal bores 12 and flow control valves 10 may be disposed in the same housing (not shown).

Flow control valve 10 includes a flow control piston 16 slidably disposed within a longitudinal bore 18 of a valve body 20. Valve body 20 has an interior wall 36 and an exterior wall 37. Flow control piston 16 has a longitudinal flow channel or slot 24. Channel 24 as shown has a varying depth and uniform width. For some applications more than one channel 24 may be formed in the exterior of piston 16. For other applications channel 24 may be formed with both a varying depth and varying width.

Piston 16 has a generally cylindrical body formed from a solid piece of material. Bore 18 provides a fluid passage 32 which receives at an up stream or first opening 34 fluid flowing through channel 24. The fluid then exits fluid passage 32, defined in part by bore 18, and down stream or second opening 38.

As the fluid flows through bores 12 and 18, a pressure differential is formed across flow control valve 10. A biasing means, such as spring 39, responds to this differential pressure by regulating the longitudinal position of piston 16 within bore 18 with respect to valve body 20. By adjusting this position, spring 39 varies the flow area associated with piston 16 (the effective flow area of channel 24) to maintain a substantially constant flow rate through flow control valve 10.

As discussed in more detail below, channel 24 significantly reduces the disturbance of the flow field as fluid flows through flow control valve 10. Additionally, the varying depth of channel 24 makes flow control valve 10 much more clog tolerant and resistant than prior flow control valves. Furthermore, irregularities along the length of channel 24 dimensions have less affect on the flow control characteristics than do irregularities in the dimensions of prior orifice type flow control valves.

For example, as piston 16 fully retracts into valve body 20 (FIGS. 4B and 4C), the effective flow area of control valve 10 is that of channel 24 (channel width×depth) at the external edge of annular shoulder 64. The width and depth of channel 24 are preferably large enough to be easily milled by standard tooling machines. Forming channel 24 with a uniform width will reduce manufacturing costs. Any irregularity (i.e., bumps, pits, etc.) along the walls or bottom of channel 24 affects the flow characteristics of valve 10 primarily when the portion of channel 24 containing the irregularity is positioned adjacent to annular shoulder 64. Fluid simply bypasses the irregularity when the irregular channel portion is positioned either up stream or down stream from annular shoulder 64.

Referring again to FIG. 1, a retainer or snap ring 40 is provided for releasably anchoring flow control valve 10 within longitudinal bore 12 in a predetermined position relative to housing 14. Housing 14 may then be coupled on each end to a pipe or conduit (not shown) through which the fluid flows. In other embodiments, however, flow control valve 10 may be installed directly into a conduit without a housing. Retainer ring 40 may be installed in a groove 42 formed in the interior wall of housing 14. Once installed, retainer ring 40 engages the up stream end of valve body 20 to limit up stream movement of valve body 20.

Similarly, a shoulder 44 on the exterior of valve body 20 engages a shoulder 46 on the interior of housing 14 to limit the movement of flow control valve 10 in a down stream direction. Thus, an exterior portion 48 of valve body 20 is anchored between retainer ring 40 and shoulder 46.

Groove 50 is preferably formed around exterior portion 48 of valve body 20 for holding seal means or O-ring 52. Seal means 52 forms a fluid barrier with the adjacent surfaces of valve body 20 and housing 14 between the up stream and down stream ends of flow control valve 10. Thus, seal means 52 directs all fluid flow within housing 14 through flow control valve 10.

Spring 39 is disposed within bore 18 for urging flow control piston 16 in an up stream direction toward a fully extended position. One end of spring 39 is seated against an interior shoulder 56 formed at the down stream end of piston 16. The other end of spring 39 is seated against a shoulder 58 of a spring retainer 60. Up stream shoulder 62 of piston 16 engages annular shoulder 68 of valve body 20 to limit the movement of piston 16 in the up stream direction.

The end of bore 18 adjacent down stream opening 38 is threaded to receive spring retainer 60, which has threads cut along a portion of its exterior. Retainer 60 is rotatable within bore 18 to vary the compression of spring 39. Varying the compression of spring 39, "fine tunes" or adjusts the designed flow rate over which flow control valve 10 maintains a substantially constant flow rate substantially equal to the designed flow rate (i.e., the selected range). Typically, this fine tuning is done during the manufacturing and assembly process to bring flow control valve 10 to within desired tolerances for the desired flow rate regulation.

Channel 24, annular shoulder 64 and spring 39 cooperate to maintain a substantially constant rate of fluid flow through fluid passage 32 over the selected range of pressure differentials across flow control valve 10. A graph of flow rate versus pressure differential for a prior flow control valve is shown in U.S. Pat. No. 5,174,330, issued to Golestaneh et al. on Dec. 29, 1992, which is hereby incorporated by reference for all purposes.

In the present invention, channel 24 lowers the minimum flow rate attainable for a given differential pressure by concentrating the flow area. Fluid flow through channel 24 is essentially parallel with fluid flow in both bore 12 and fluid passage 32.

Referring to FIG. 2, flow control piston 16 is shown in more detail. Piston 16 is formed from a generally solid cylinder 66. Piston 16 has a down stream end 72 with an enlarged diameter forming shoulders 56 (FIG. 1) and 62. Down stream end 72 has a generally cylindrical shape compatible with the dimensions of bore 18, with the exception of flat sides 76a and 76b and a cut-out 78. Piston 16 also has an up stream end 74 with a diameter smaller than that of down stream end 72.

An advantage provided by the diameter of up stream end 74 is that it is smaller than the diameter of pistons used in prior control valves. Ideally, a control valve forces fluid to flow through only the channels or orifices in a piston designed for passage of the fluid. In actual operation, however, fluid often leaks through a control valve along the perimeter of the piston. The perimeter of a piston is directly related to the piston's diameter. That is, if a piston has a larger diameter, it will have a larger perimeter. Thus, because flow control valve 10 has piston 16 with a smaller diameter at up stream end 74 than prior control valves, the leakage of fluid associated with the perimeter of the piston is reduced.

Flow channel 24 is formed along the exterior of cylinder 66 extending longitudinally from down stream end 72 to up stream end 74. In the embodiment represented by FIGS. 1–4C, piston 16 is shown having a single channel 24 on the exterior of cylinder 66. However, other embodiments of piston 16 may have more channels 24, which may or may not be symmetrically spaced on the exterior of cylinder 66, as the desired flow rate design dictates. Channel 24 preferably has a width equal to or less than one-half the diameter of cylinder 66 adjacent to up stream end 74. The width of channel 24 remains substantially constant from the end adjacent to up stream end 74 to the end adjacent to down stream end 72. Also, channel 24 is shown as having a varying depth throughout. The depth of channel 24 is relatively shallow at the end adjacent to up stream end 74 as opposed to the end adjacent to down stream end 72. In between its two ends, the depth of channel 24 tapers from the down stream depth to the up stream depth. Other embodiments may have bottoms of varying contour to alter the flow characteristics of piston 16. Because the flow area associated with channel 24 is substantially perpendicular to the fluid flow through channel 24, this flow area increases in an up-stream-to-down-stream direction.

The dimensions of channel 24 (end depths and width) and length of piston 16 depend upon the predetermined flow control range and designed flow rate of flow control valve 10. These dimensions and this length are respectively calculated using well known mathematical formulas which describe fluid flow as a function of pressure differential and effective flow area. Cut-out 78 is provided in down stream end 72 to prevent or minimize disturbance in the flow field as fluid exits channel 24.

Referring to FIG. 3, flow control piston 16 is shown disposed within a portion of valve body 20 and housing 14. Spring retainer 60 and spring 39 are not illustrated. Down stream end 72 of piston 16 has a diameter roughly equal to the diameter of interior wall 36 of valve body 20.

Flat sides 76a and 76b facilitate machining of piston 16 and channel 24. If down stream end 72 was essentially circular except for cut-out 78, piston 16 would need to be tightly held within a vise to keep piston 16 from rotating during manufacture, such as when channel 24 is cut into cylinder 66 of piston 16. However, piston 16 could be deformed if the vise is too tight. Flat sides 76a and 76b allow piston 16 to be securely held during machining, without causing deformation of piston 16. Flat sides 76a and 76b also help identify the location where channel 24 is to be cut.

Referring generally to FIGS. 4A–C, the operation of flow control valve 10 is now discussed. In general, a fluid flows into the effective flow area defined by channel 24 and shoulder 64 and out through cut-out 78 or around flat sides 76a and 76b (FIG. 3), into fluid passage 32 (FIG. 1) and exits through down stream opening 38. The effective flow area of channel 24 is the only opening (in a plane perpendicular to the fluid flow) exposed on the up stream side of annular shoulder 64. That is, annular shoulder 64 cooperates with cylinder 66 of piston 16 to force virtually all fluid flow through channel 24.

Referring to FIG. 4A, when the pressure differential across flow control valve 10 is at or below the minimum pressure required to enter the selected range, spring 39 urges piston 16 to a fully extended (i.e., low differential pressure) position with respect to bore 18. In this fully extended position, the maximum flow area of channel 24 is available for fluid flow. As the pressure differential falls below the minimum, the flow rate will fall too. Shoulders 62 and 68 prevent piston 16 from extending further to increase the effective flow area and compensate for the pressure drop.

Still referring to FIG. 4A, as the pressure differential increases beyond the required minimum pressure, piston 16 is forced to retract into bore 18 until the force exerted on piston 16 by spring 39 in the up stream direction equals that exerted by the fluid flow in the down stream direction. As piston 16 retracts, the effective flow area of channel 24 is reduced. Thus, when the fluid differential pressure force equals the spring force, piston 16 is in a partially extended or intermediate flow control position where the effective flow area of flow control valve 10 is such that a substantially constant flow rate through control valve 10 is maintained. The variable depth of channel 24 is a major factor in determining the position of piston 16.

Referring to FIG. 4B, as the pressure differential across flow control valve 10 increases further, the effective flow area of channel 24 is reduced even more. Thus, as piston 16 is retracted, the change in the effective flow area (required to keep the flow rate constant) is attributable primarily to a change in the position of piston 16 and channel 24 relative to shoulder 64 which corresponds to the depth of channel 24.

Referring to FIG. 4C, as the pressure differential reaches the maximum pressure of the selected range, piston 16 is in a fully retracted (i.e., high differential pressure) position with respect to bore 18; the effective flow area is reduced to a minimum, although there is still fluid flow into channel 24. As the pressure differential increases beyond the maximum, the flow rate will increase, because piston 16 may retract no further to vary the flow area to maintain a substantially constant flow rate. It is understood that in most applications, flow control valve 10 will have a selected range of pressure differentials which is large enough to encompass expected maximum and minimum pressure differentials within the fluid system in which it is installed.

Valve 10 with channel 24 provides numerous advantages over prior control valves. For example, by providing a flow path which is substantially parallel to the flow path through the conduit (not shown) and bore 12, channel 24 reduces the amount of disturbance in the flow field generated as fluid flows through control valve 10. That is, as fluid flows from the shallow end of a channel 24 into up stream opening 34 of valve body 20, the fluid is not required to sharply turn. Channel 24 allows the fluid to flow into up stream opening 34 in a path substantially parallel to the natural flow path of the fluid through the conduit. Prior control valves often contain channels in which fluid must flow into side orifices at a substantially perpendicular angle from the natural flow path. In the present invention, therefore, less disturbance in the flow field is created than if the fluid was required to enter a side orifice at a sharp angle.

A reduction in disturbances in the flow field provides advantages. Because less disturbance is generated, less kinetic energy is lost. That is, because the fluid enters up stream opening 34 in a path parallel to the natural flow path, disturbances in the flow field and, hence, loss of kinetic energy, are reduced.

Another advantage provided by the valve 10 with varying-depth design of channel 24 is a reduction in the likelihood that a fluid borne particle will lodge itself within channel 24. Because channel 24 deepens toward its down stream end, a fluid borne particle is typically forced toward a deeper portion, not a shallower portion, until the particle passes into fluid passage 32. Even if a particle does become wedged in channel 24, the particle may not significantly effect the flow control capability of valve 10. The fluid will typically flow over the wedged particle and back into channel 24. The same is true for a deformity in channel 24. The fluid will simply flow around the deformity and back into the non-deformed down stream portion of channel 24. Also, a particle may wedge between valve body 20 and channel 24 when piston 16 is in an intermediate flow control position. However, control valve 10 will typically purge itself of the particle when piston 16 returns to a substantially fully extended position (during times when there is reduced differential pressure across valve 10), whereby the particle will typically dislodge and exit through fluid passage 32.

Still another advantage is that because of the flow control provided by channel 24, the smallest dimensions of channel 24 are typically larger than those of prior channels for a given flow rate design; these larger dimensions of channel 24 are more easily machined with standard precision machine tools. For example, the depth and width of channel 24 define its flow area. Since the effective flow area of flow channel 24 is located at annular shoulder 64, rather than extending along the entire cylinder 66 of piston 16, extremely narrow ports are not required as with many prior pistons. Also, because flat sides 76a and 76b facilitate machining of piston 16 (as explained before), channel 24 may be easily fabricated with standard precision machine tools.

A further advantage provided by channel 24 is that it typically extends the entire length of piston 16. This extension provides for a variable effective flow area along the entire length of piston 16. Prior pistons often have only side ports which do not extend the length of the piston. Thus, prior pistons provide for a variable effective flow area only along the portion of the piston integral with the side ports.

Although the present invention and its advantages have been described in detail, it should be understood that various changes, substitutions and alterations can be made therein without departing from the spirit and scope of the invention as defined by the appended claims.

What is claimed is:

1. A flow control valve comprising:

a valve body having a longitudinal bore with a flow passage extending therethrough;

a piston slidably disposed within the bore for varying the fluid flow area of the flow passage through the control valve, the piston having a body formed from a solid piece of material;

at least one longitudinal flow channel formed in the exterior of the piston, the longitudinal flow channel having an up stream end and a down stream end for communicating fluids therethrough;

an annular shoulder formed on the valve body adjacent to the exterior of the piston intermediate the up stream end and the down stream end of the longitudinal flow channel whereby movement of the piston in response to changes in differential pressure across the valve body provides a substantially constant fluid flow over a selected range of pressure differentials;

the longitudinal flow channel having a varying depth; and the longitudinal flow channel having a substantially constant width.

2. The valve of claim 1 further comprising:

the piston having an outside diameter and the longitudinal flow channel having a width; and the width of the longitudinal flow channel equal to or less than one half the outside diameter of the piston.

3. The valve of claim 1 further comprising a biasing member for urging the piston against the fluid flow.

4. The valve of claim 3 wherein the biasing member comprises a spring.

5. The valve of claim 4 further comprising a shoulder formed on the piston for engaging the annular shoulder of the valve body to limit the up stream movement of the piston.

6. The valve of claim 5 further comprising a spring retainer attached to the valve body for retaining the spring within the bore, the retainer movable relative to the valve body to adjust the force exerted by the spring on the piston.

7. The valve of claim 1 further comprising the piston slidably disposed within the bore to vary the flow area of the longitudinal flow channel such that the fluid flow through the control valve is substantially constant over the selected range of pressure differentials.

8. The valve of claim 1 wherein the piston has an up stream end and a down stream end, the down stream end having a generally cylindrical shape except for a cut-out.

9. A flow control valve comprising:

a valve body having a longitudinal bore with a first flow passage extending therethrough;

a piston slidably disposed within the bore for varying the fluid flow area of the first flow passage through the control valve, the piston having a generally cylindrical, solid body;

a single longitudinal flow channel formed in the cylindrical body for communicating fluid therethrough;

an annular shoulder formed on the valve body adjacent to the exterior of the piston whereby movement of the piston in response to changes in differential pressure across the valve body provides a substantially constant fluid flow over a selected range of pressure differentials;

the flow channel having an up stream end with an up stream depth and a down stream end with a down stream depth, the up stream depth less than the down stream depth; and the flow channel having a substantially constant width.

10. The valve of claim 9 further comprising the flow channel having a depth which longitudinally tapers from the down stream depth to the up stream depth.

11. The valve of claim 9 further comprising the piston slidably disposed within the bore to vary the flow area of the flow channel such that the fluid flow through the control valve is substantially constant over the selected range of pressure differences.

12. A flow control valve for maintaining a substantially constant fluid flow therethrough, the control valve comprising:

a valve body having a longitudinal bore with a fluid passage extending therethrough;

a piston having a generally cylindrical, solid configuration and a longitudinal flow channel formed in the exterior of the piston;

the longitudinal flow channel having an up stream end and a down stream end, the depth of the up stream end less than the depth of the down stream end and a substantially constant width;

a biasing member disposed within the longitudinal bore for resiliently urging the piston against the fluid flow;

the longitudinal flow channel communicating fluid with the fluid passage; and the piston slidably disposed in the bore for cooperation with the biasing member to vary the flow area of the longitudinal flow channel such that the fluid flow is substantially constant over a selected range of pressure differentials across the control valve.

13. The valve of claim 12 further comprising:

the longitudinal flow channel having a depth longitudinally tapering from the down stream end to the up stream end; and the piston slidably disposed within the bore to vary the flow area of the longitudinal flow channel in response to pressure changes across the control valve such that the fluid flow remains substantially constant over the selected range of pressure differentials.

14. The valve of claim 12 wherein the valve body further comprises:

an annular shoulder formed within the longitudinal bore; and the piston further comprises a shoulder for cooperating with the annular shoulder to restrict the up stream movement of the piston.

15. The valve of claim 12 wherein the piston has an up stream end with a first diameter and a down stream end with a second diameter larger than the first diameter.

16. A flow control valve for maintaining a substantially constant flow therethrough, the control valve comprising:

a valve body having a longitudinal bore with a fluid passage extending therethrough;

a piston having a general cylindrical, solid configuration and a longitudinal flow channel formed in the exterior of the piston;

the longitudinal flow channel having an up stream end and a down stream end, the depth of the up stream end less than the depth of the down stream end and a substantially constant width;

a biasing member disposed within the longitudinal bore for resiliently urging the piston against the fluid flow;

the longitudinal flow channel communicating fluid with the fluid passage; the piston slidably disposed in the bore for cooperation with the biasing member to vary the flow area of the longitudinal flow channel such that the fluid flow is substantially constant over a selected range of pressure differentials across the control valve;

wherein the piston has an up stream end with a first diameter and a down stream end with a second diameter larger than the first diameter;

wherein the down stream end of the piston has a generally cylindrical shape except for a first flat side, a second flat side, and a cutout; and wherein the down stream end of the piston has a generally cylindrical shape except for a first flat side, a second flat side, and a cut-out.

17. A flow control valve for maintaining a substantially constant flow therethrough, the control valve comprising:

a valve body having a longitudinal bore with a fluid passage extending therethrough;

a piston having a general cylindrical solid configuration and a longitudinal flow channel formed in the exterior of the piston;

the longitudinal flow channel having an up stream end and a down stream end, the depth of the up stream end less than the depth of the down stream end and a substantially constant width;

a biasing member disposed within the longitudinal bore for resiliently urging the piston against the fluid flow;

the longitudinal flow channel communicating fluid with the fluid passage; the piston slidably disposed in the bore for cooperation with the biasing member to vary the flow area of the longitudinal flow channel such that the fluid flow is substantially constant over a selected range of pressure differentials across the control valve;

wherein the piston has an up stream end with a first diameter and a down stream end with a second diameter larger than the first diameter;

wherein the down stream end of the piston has a generally cylindrical shape except for a first flat side, a second flat side, and a cutout; and wherein the down stream end of the longitudinal flow channel extends through the cut-out at the down stream end of the piston.

18. The valve of claim 12 wherein the biasing member comprises a spring.

19. A flow control valve for automatically regulating a fluid flowing through a conduit, the control valve comprising:

a valve body having interior and exterior walls, the interior wall defining a longitudinal bore having a flow passage extending therethrough, the exterior wall defining a first shoulder for engaging the conduit to retain the control valve in a fixed position within the conduit;

a piston having a solid, generally cylindrical body with one longitudinal flow channel formed in the exterior thereof;

the channel having an up stream end and a down stream end and the depth of the channel varying longitudinally from the down stream end to the up stream end, and the channel having a substantially constant width, wherein the fluid flows through the channel into the flow passage;

a spring disposed within the bore for resiliently urging the piston against the fluid flow, wherein the valve body has an annular shoulder and the piston has a second shoulder for cooperating with the annular shoulder to limit the up stream movement of the piston; and the piston slidably disposed in the bore for varying the effective flow area of the channel such that the fluid flow through the control valve is substantially constant over a selected range of pressure differentials across the control valve.

* * * * *